United States Patent
Prior et al.

(10) Patent No.: US 10,422,016 B2
(45) Date of Patent: Sep. 24, 2019

(54) TOOLING FOR STRESS RELIEVING A TURBINE WHEEL AND SHAFT

(71) Applicant: GARRETT TRANSPORTATION I INC., Torrance, CA (US)

(72) Inventors: Angelo Prior, Mozzagrogna-Chieti (IT); Maurizio Barbone, Atessa-Chieti (IT)

(73) Assignee: Garrett Transportation I Inc., Torrance, CA (US)

( * ) Notice: Subject to any disclaimer, the term of this patent is extended or adjusted under 35 U.S.C. 154(b) by 149 days.

(21) Appl. No.: 15/235,025

(22) Filed: Aug. 11, 2016

(65) Prior Publication Data

US 2018/0044756 A1 Feb. 15, 2018

(51) Int. Cl.
*H05B 6/10* (2006.01)
*C21D 9/50* (2006.01)
(Continued)

(52) U.S. Cl.
CPC .............. *C21D 9/505* (2013.01); *C21D 1/30* (2013.01); *C21D 1/42* (2013.01); *C21D 9/28* (2013.01);
(Continued)

(58) Field of Classification Search
CPC .......... C21D 9/0068; C21D 9/28; C21D 9/32; C21D 9/36; C21D 9/40; C21D 9/50; C21D 9/505; C21D 1/09; C21D 1/10; C21D 1/18; C21D 1/19; C21D 1/40; C21D 1/42; C21D 1/28; C21D 1/30; F01D 5/005; F01D 5/02; F01D 5/186; F01D 5/286; F01D 25/12; F01D 25/16; F01D 5/063; H05B 6/02; H05B 6/06; H05B 6/10; H05B 6/101; H05B 6/36; H05B 6/40; H05B 6/405;
(Continued)

(56) References Cited

U.S. PATENT DOCUMENTS 5,213,636 A * 5/1993 Akers ...................... C21D 1/10
219/640
6,115,917 A 9/2000 Keller et al.
(Continued)

OTHER PUBLICATIONS

"Communication", including an extended European Search Report and a written opinion in corresponding European Application No. EP 17 183 4195, dated Dec. 20, 2017.

*Primary Examiner* — Hung D Nguyen
(74) *Attorney, Agent, or Firm* — The Law Office of John A. Griecci

(57) ABSTRACT

A tool system for stress relieving a turbocharger turbine wheel longitudinally welded to a hardened rotor shaft. The shaft has a journal bearing region and a turbine-end body forming an A datum surface for receiving an axial bearing. The tool system includes an induction coil and an electronic oscillator, and a tool. The tool forms an opening configured to receive the rotor shaft such that the journal bearing region of the shaft extends into the tool housing while the A datum surface adjoins an end of the tool housing. The induction coil is positioned around the turbine-end body. The housing forms an annular cooling chamber surrounding the journal bearing region of the shaft. The housing forms an inlet passage to provide cooling fluid to the annular chamber, and an outlet passage to remove cooling fluid from the annular chamber.

11 Claims, 3 Drawing Sheets

(51) Int. Cl.
*C21D 1/30* (2006.01)
*C21D 1/42* (2006.01)
*C21D 9/28* (2006.01)
*F01D 5/02* (2006.01)
*F01D 25/12* (2006.01)
*F01D 25/16* (2006.01)
*F01D 5/06* (2006.01)
*H05B 6/36* (2006.01)
*B23P 15/00* (2006.01)
*C21D 1/10* (2006.01)
*C21D 1/26* (2006.01)

(52) U.S. Cl.
CPC ............... *F01D 5/02* (2013.01); *F01D 5/063* (2013.01); *F01D 25/12* (2013.01); *F01D 25/16* (2013.01); *H05B 6/101* (2013.01); *B23P 15/006* (2013.01); *C21D 1/10* (2013.01); *C21D 1/26* (2013.01); *F05D 2220/40* (2013.01); *F05D 2230/233* (2013.01); *F05D 2230/234* (2013.01); *F05D 2240/60* (2013.01); *F05D 2260/83* (2013.01); *Y02P 10/253* (2015.11)

(58) Field of Classification Search
CPC . H05B 6/42; F05D 2220/40; F05D 2230/233; F05D 2230/234; F05D 2240/60; F05D 2260/83; Y02P 10/253; B23P 15/006
USPC ....... 219/635, 639, 640, 647, 652, 674, 677; 266/90, 103, 129, 249, 252
See application file for complete search history.

(56) References Cited

U.S. PATENT DOCUMENTS

2004/0089655 A1 5/2004 Matsen et al.
2010/0140230 A1 6/2010 Schreiber et al.
2010/0281688 A1 11/2010 Nolan et al.

* cited by examiner

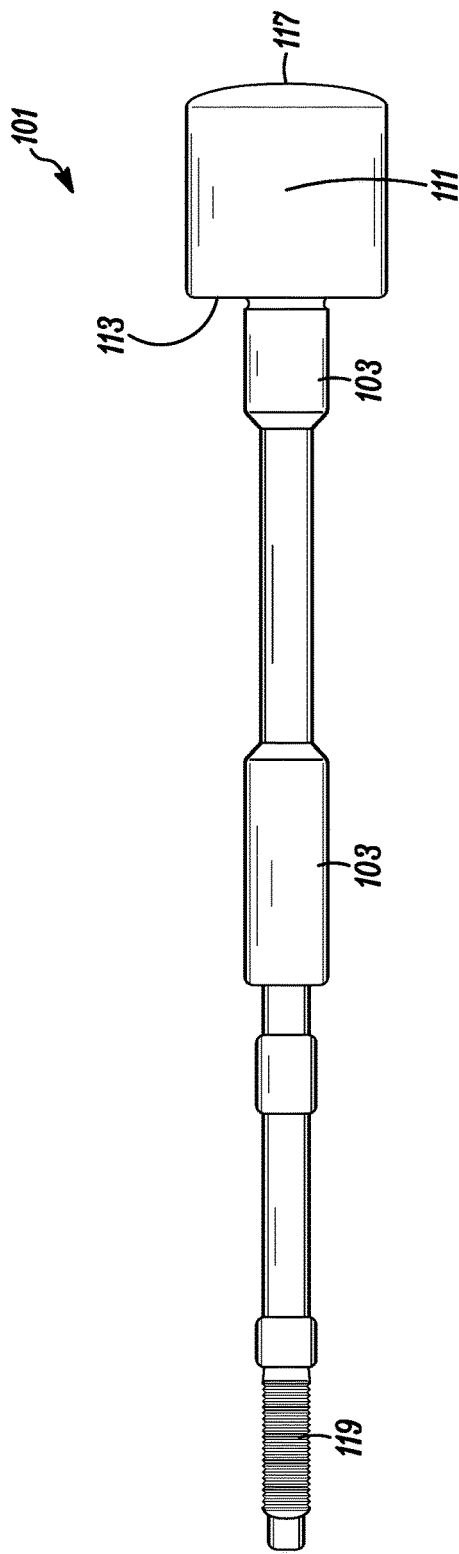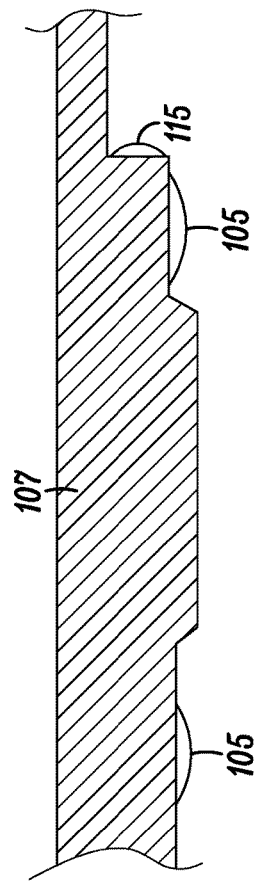
FIG. 1
FIG. 2

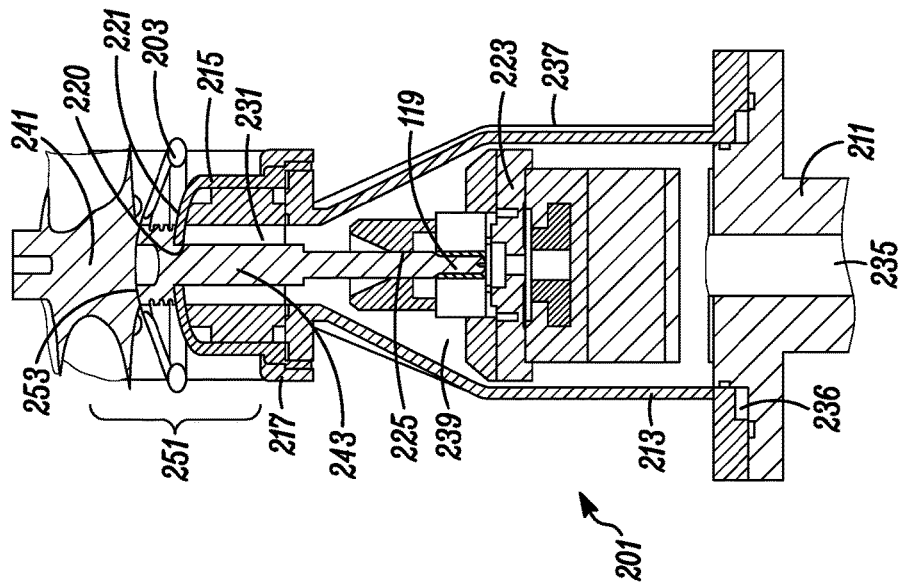
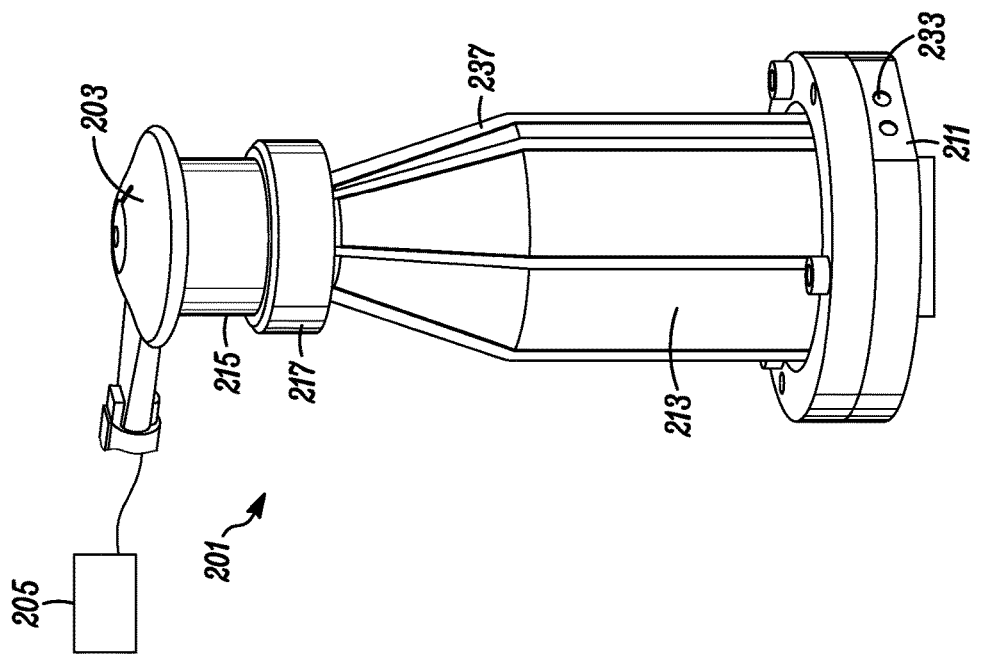

TOOLING FOR STRESS RELIEVING A TURBINE WHEEL AND SHAFT

The present invention relates generally to turbocharger turbine rotor manufacture, and more particularly, to a method and related tooling for stress relieving a turbine wheel and shaft weld.

BACKGROUND OF THE INVENTION

In the process of assembling a turbocharger rotor, a turbine wheel and a shaft are typically welded to each other, such as by electron beam and laser welding. In order to remove internal residual stresses generated by the welding, it is known to use a "welding stress relieve" process in which the weld is heated up to a high temperature, and then control-cooled to a lower temperature.

It is known to use induction heating to stress relieve the weld between the turbine wheel and its rotor shaft. This induction heating process entails heating the weld by electromagnetic induction, through heat generated in the area around the weld by eddy currents. The eddy currents are generated by an electromagnet that is driven by an electronic oscillator passing high-frequency alternating current through the electromagnet.

This induction heating process generates heat inside the weld area itself, rather than generating it externally and applying it to an outer surface. Thus, the weld area can be heated rapidly. This process provides numerous benefits, including good heat uniformity and quality, and reduced cycle time. More particularly, because induction heating heats from within, it increases uniformity, and reduces the time needed to uniformly reach the desired temperature. The uniformity leads to better quality. Induction heating is also safe, reliable, easy to use, and power-efficient. For example, stress relieving through an induction method is worker-friendly in that it does not require the handling of hot heating elements and connectors.

Nevertheless, the use of the induction stress relieve process is a source of hardness degradation on an already hardened rotor shaft. More particularly, the heating of the region of the weld area leads to conductive heating of the hardened rotor shaft. This can lead to a degradation of the hardness of the journal bearing area and A Datum surface (i.e., the axial bearing surface) of the shaft, which can increase the noise created by operation of the turbocharger due to a weakened bearing area of the rotor shaft.

Accordingly, there has existed a need for a way to stress relieve the connection between a turbocharger turbine wheel and a rotor shaft without degrading the hardness of the rotor shaft.

SUMMARY OF THE INVENTION

In various embodiments, the present invention may solve some or all of the needs mentioned above, providing a way to stress relieve the connection between a turbocharger turbine wheel and a rotor shaft without degrading the hardness of the rotor shaft.

Common embodiments of the invention provide a tool system for stress relieving a turbocharger turbine wheel longitudinally welded to an end region of a hardened rotor shaft, the shaft having a journal bearing region of the shaft for receiving at least one radial journal bearing, and the shaft having a turbine-end body forming an A datum surface for receiving an axial bearing. The tool system includes an electromagnetic induction coil, an electronic oscillator electronically attached to the induction coil, and a tool including a tool housing. The electronic oscillator is electronically connected to the induction coil, and is adapted to drive the induction coil electromagnet with alternating current to create an alternating electromagnetic field.

The tool forms an opening sized to receive the rotor shaft such that the journal bearing region of the shaft extends into the tool housing while the A datum surface adjoins an end of the tool housing, most typically resting vertically upon that end of the tool housing. The induction coil is sized to be positioned around the turbine-end body such that the electromagnetic field of the coil surrounds the turbine-end body of the hardened rotor shaft.

With the rotor shaft received in the opening of the tool, the housing forms an annular cooling chamber surrounding the journal bearing region of the shaft. The housing forms an inlet passage to provide cooling fluid to the annular chamber from a cooling fluid inlet port, and wherein the housing forms an outlet passage to remove cooling fluid from the annular chamber to a cooling fluid outlet port. Advantageously, the induction coil is positioned to stress relieve the weld between the shaft and the turbine wheel, while cooling fluid in the cooling chamber prevents degradation of the hardness of the bearing surfaces and A datum surface of the shaft.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 1 is a perspective view of a turbocharger rotor shaft for use with a tool embodying the present invention.

FIG. 2 is a cross-sectional view of a bearing housing wall for use with the turbocharger rotor shaft of FIG. 1.

FIG. 3 is a perspective view of a tool embodying the present invention.

FIG. 4 is a cross-sectional view of the tool depicted in FIG. 3.

DETAILED DESCRIPTION OF THE PREFERRED EMBODIMENTS

Figure 5:
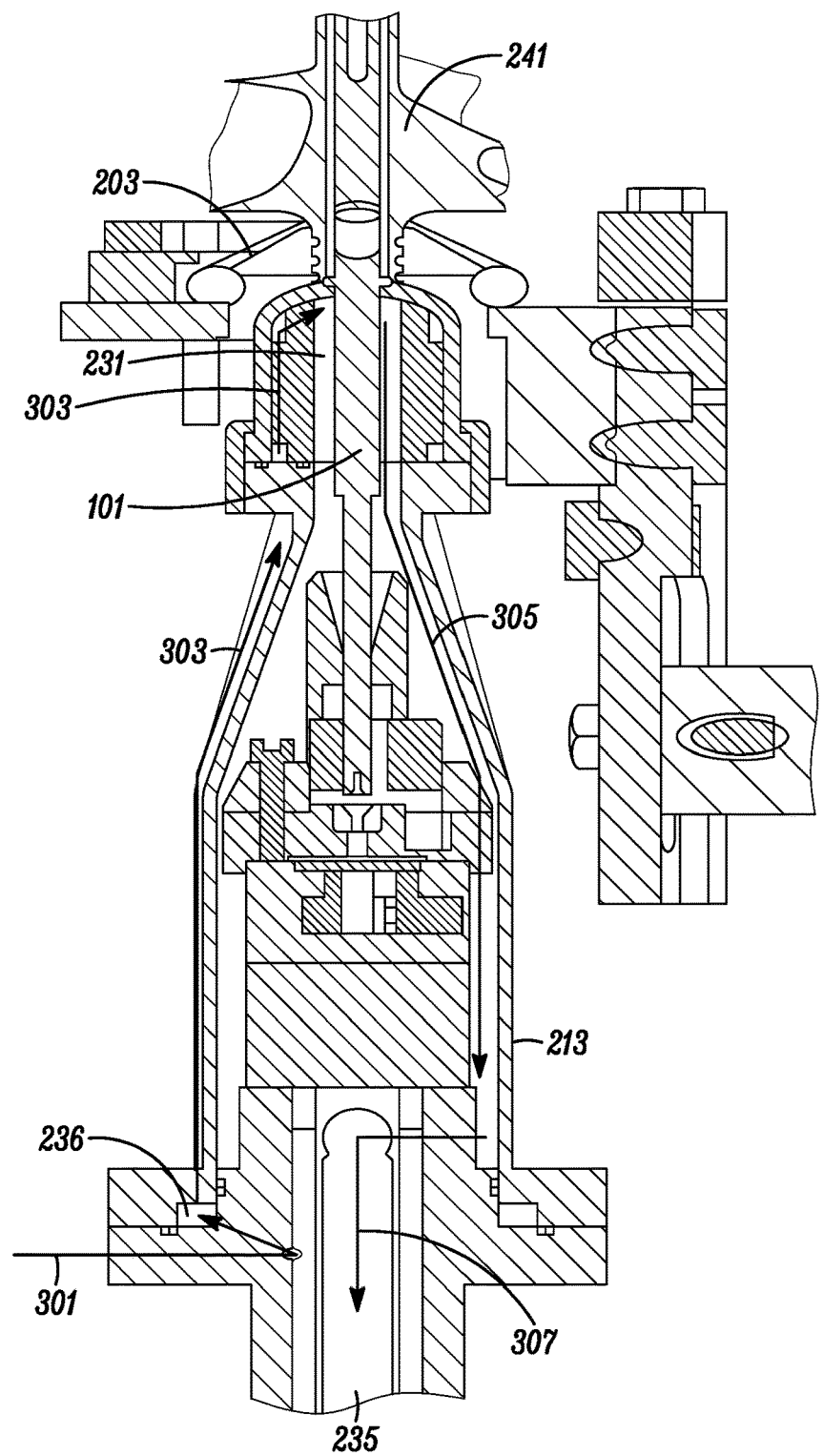
FIG. 5 is a cross-sectional view of the tool depicted in FIG. 3 that includes indications of flow paths.

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

With reference to FIGS. 1 and 2, a typical rotor shaft 101 will include cylindrical journal bearing surfaces 103 which will be supported by radial bearings 105 in a bearing housing 107. The shaft 101 will also include a first end region forming a turbine-end body 111 having an A datum surface 113 facing the journal bearing surfaces, the A datum surface being sized and positioned to be supported by an axial bearing 115 in the bearing housing 107. The turbine-end body forms an end surface 117 to which a turbine wheel will be welded, the end surface being on an axially opposite end of the turbine-end body from the A datum surface. The hardness of the bearing shaft is important, in that it affects the balancing of the rotor, and thus the noise generated during rotor rotation. The shaft further includes a second end region 119 at the opposite end of the shaft from the first end region.

With reference to FIGS. 1 through 5, typical embodiments of the present invention provide a tool system including a tool 201 and a round induction coil 203 forming an electromagnetic coil that can be driven by an electronic oscillator 205 configured to pass high-frequency alternating current through the induction coil. The tool has an integrated liquid cooling system. The tool includes a base 211 upon which the remainder of the tool is supported. Serially, upon the base is a first housing portion 213 attached to the base, and a second housing portion 215 attached to the first housing portion by a connection ring 217.

The induction coil 203 is sized and shaped with a hole to be concentrically received around a top end 221 of the second housing portion 215, which is at an opposite end from where the second housing portion is adjoined to the first housing portion 213. The first and second housing portions form a tool housing that rest upon the base 211. The second housing portion 215 of the tool housing forms an opening 220. This opening and the induction coil hole are configured and sized to receive the shaft 101 such that the A datum surface 113 of the shaft adjoins and rests upon the top end 221 of the second housing portion with the induction coil hole received around the turbine-end body 111.

Within the first housing portion 213 is a support structure 223 forming a bore 225 positioned to receive the second end region 119 of the rotor shaft 101 when the A datum surface 113 rests upon the top end 221 of the second housing portion. The top end 221 of the second housing portion 215 and the support structure bore 225 combine to form a passageway sized to precisely position the turbine-end body 111 such that it is concentric with the induction coil 203, with the induction heating coil 203 concentrically surrounding the turbine-end body 111.

With the hardened shaft 101 fully received within the passageway of the tool housing with the A datum surface 113 resting upon the top end 221 of the second housing portion, in the longitudinal direction (with respect to the shaft), the induction coil has a conical shape, with a wider diameter around the opening 220 of the second housing portion 215, and a smaller diameter around a weld location 253 between the turbine wheel and the end surface 117 of the shaft turbine-end body 111.

Also, with the hardened shaft 101 received fully within the passageway of the tool housing with the A datum surface 113 resting upon the top end 221 of the second housing portion, the second housing portion 215 forms a cooling chamber 231 surrounding a portion of the shaft including the journal bearing surface 103 that is closest to the A datum surface. The base 211 includes a cooling fluid inlet ports 233 and a cooling fluid outlet port 235. The base forms fluid connection channels 236 from the inlet port 233 to inlet passage supply tubes 237 on the outer wall of the first housing portion, which feed cooling fluid to immediately inside the top end 221 of the second housing portion cooling chamber 231. The housing is configured to form an outlet passage 239 within the first housing portion, which allows heated cooling fluid to flow down through the housing to the cooling fluid outlet port 235.

Functional Method

With reference to FIGS. 1-5, in this embodiment of the invention a turbine rotor shaft 101 is hardened by well-known procedures, and then preferably ground to desired specifications. It should be noted that hardening after grinding could change the diameters of the journal bearing surfaces 103, which is undesirable. Next, a turbine wheel 241 is welded to the end surface 117 of the shaft, such as by electron beam or laser welding. The preferable order under the present embodiment is to harden the shaft, then to grind it, and finally to weld it.

The large diameter portion of the induction coil 203 is then positioned concentrically around the top end 221 of the second housing portion 215 of the above-described tool (which includes the base 211, the first housing portion 213, the second housing portion 215 and the support structure 223). Optionally, the induction coil could be permanently affixed in this position. The hardened, ground and welded shaft wheel assembly is concentrically lowered into the opening 220 of the second housing portion 215 until the A datum surface 113 adjoins the top end 221 of the second housing portion, the second end region 119 of the shaft 101 is received in the bore 225 of the support structure 223, and a cooled-shaft-portion 243 of the shaft is within the cooling chamber 231. The cooled-shaft-portion is immediately adjacent the turbine-end body 111 of the shaft and includes the journal bearing surface 103 that is closest to the A datum surface.

A cooling fluid that is typically at or below room temperature is streamed 301 into the inlet port 233 with enough pressure drive the cooling fluid into the fluid connection channels 236. The fluid is then streamed 303 up through the supply tubes 237 and to the top of the cooling chamber 231. The cooling fluid thereby contacts the cooled-shaft-portion 243 and then is streamed 305 down through the first housing portion 213 to then stream 307 out the outlet port 235.

The induction coil 203 is driven by the 205 electronic oscillator, passing high-frequency alternating current through the electromagnet of the induction coil. A heated-rotor-portion 251 of the turbine wheel 241 and rotor shaft 101 is thereby heated to a weld-temperature significant enough to stress relieve the weld location 253 between the turbine wheel and shaft. For example, heating the weld to 700° C. or higher could be used to stress relieve the weld. Standard stress relief procedures are followed in cooling the weld location 253.

While the heating occurs, the coolant is driven through the cooling chamber 231 at a rate such that the cooled-shaft-portion 243 and the A datum end 113 of the turbine-end body 111 stays below an A datum temperature that minimizes the degradation of the hardening of the shaft, e.g., 300° C. Thus, over the axial length of the turbine-end body 111 the temperature of the turbine-end body varies from the weld-temperature to the A datum temperature.

It is to be understood that various embodiments of the invention comprise apparatus and related methods turbine shaft wheel assembly. Additionally, the various embodiments of the invention can incorporate various combinations of the features described above with other related efficiency features. In short, the above disclosed features can be combined in a wide variety of configurations within the anticipated scope of the invention.

What is claimed is:

1. A tool system for stress relieving a weld of a turbocharger turbine wheel longitudinally welded to an end region of a hardened rotor shaft, the hardened rotor shaft having a journal bearing region of the hardened rotor shaft for receiving at least one radial journal bearing, and the hardened rotor shaft having a turbine-end body forming an A datum surface for receiving an axial bearing, comprising:
    an electromagnetic induction coil;
    an electronic oscillator electronically attached to the electromagnetic induction coil, and being adapted to drive the electromagnetic induction coil with alternating current to create an alternating electromagnetic field; and
    a tool, including a tool housing;
    wherein the tool forms an opening sized to receive the hardened rotor shaft such that the journal bearing region of the hardened rotor shaft extends into the tool housing while the A datum surface adjoins an end of the tool housing;
    wherein the electromagnetic induction coil is sized to be positioned around the turbine-end body such that an electromagnetic field from the electromagnetic induction coil surrounds the turbine-end body of the hardened rotor shaft;
    wherein, with the hardened rotor shaft fully received in the opening of the tool, the tool housing forms an annular cooling chamber surrounding the journal bearing region of the hardened rotor shaft;
    wherein there is an inlet passage to provide cooling fluid to the annular cooling chamber from a cooling fluid inlet port; and
    wherein the tool housing forms an outlet passage to remove cooling fluid from the annular cooling chamber to a cooling fluid outlet port.

2. The tool system of claim 1, wherein the tool housing forms the inlet passage and the outlet passage.

3. The tool system of claim 2, wherein the inlet passage is in the form of inlet passage supply tubes extending along an outside edge of the tool housing.

4. The tool system of claim 2, wherein the outlet passage is within the tool housing.

5. The tool system of claim 1, wherein within the tool housing is a support structure forming a bore positioned to receive an end region of the hardened rotor shaft opposite the turbine-end body when the A datum surface rests upon the end of the tool housing.

6. A tool for stress relieving a turbocharger turbine wheel longitudinally welded to an end region of a hardened rotor shaft, the hardened rotor shaft having a journal bearing region of the hardened rotor shaft for receiving at least one radial journal bearing, and the hardened rotor shaft having a turbine-end body forming an A datum surface for receiving an axial bearing, comprising:
    a tool housing;
    wherein the tool housing forms an opening sized to receive the hardened rotor shaft such that the journal bearing region of the hardened rotor shaft extends into the tool housing while the A datum surface adjoins an end of the tool housing;
    wherein, with the hardened rotor shaft fully received in the opening of the tool housing, the tool housing forms an annular cooling chamber surrounding the journal bearing region of the hardened rotor shaft;
    wherein there is an inlet passage to provide cooling fluid to the annular cooling chamber from a cooling fluid inlet port; and
    wherein the tool housing forms an outlet passage to remove cooling fluid from the annular cooling chamber to a cooling fluid outlet port.

7. The tool system of claim 6, wherein the tool housing forms the inlet passage and the outlet passage.

8. The tool system of claim 7, wherein the inlet passage is in the form of inlet passage supply tubes extending along an outside edge of the tool housing.

9. The tool system of claim 7, wherein the outlet passage is within the tool housing.

10. The tool system of claim 6, wherein within the tool housing is a support structure forming a bore positioned to receive an end region of the hardened rotor shaft opposite the turbine-end body when the A datum surface rests upon the end of the tool housing.

11. A method for stress relieving a turbocharger turbine shaft wheel assembly, including a turbine wheel longitudinally welded via a weld to an end region of a rotor shaft, wherein the rotor shaft is hardened and ground, the rotor shaft having a journal bearing region of the rotor shaft for receiving at least one radial journal bearing, and the rotor shaft having a turbine-end body forming an A datum surface for receiving an axial bearing, comprising:
    providing a tool including a tool housing having an end that forms an opening sized to receive the rotor shaft such that the journal bearing region of the rotor shaft extends into the tool housing while the A datum surface adjoins an end of the tool housing, wherein, with the rotor shaft fully received in the opening of the tool housing, the tool housing forms an annular cooling chamber surrounding the journal bearing region of the rotor shaft, wherein there is an inlet passage to provide cooling fluid to the annular cooling chamber from a cooling fluid inlet port, and wherein the tool housing forms an outlet passage to remove cooling fluid from the annular cooling chamber to a cooling fluid outlet port;
    positioning an induction coil around the end of the tool housing;
    inserting the turbocharger turbine shaft wheel assembly into the opening of the tool housing such that the A datum surface adjoins the end of the tool housing, and such that a cooled-shaft-portion of the rotor shaft is within the annular cooling chamber;
    streaming a cooling fluid into the inlet port such that the cooling fluid is driven into the annular cooling chamber; and
    driving the induction coil with an electronic oscillator through a range of temperatures adequate to stress relieve the weld.

\* \* \* \* \*